United States Patent [19]
Martin et al.
[11] 3,904,829
[45] Sept. 9, 1975

[54] DEMAND DRIVEN MULTIPLEXING SYSTEM

[75] Inventors: Robert F. Martin, Orange; Robert D. MacDonald, Anaheim; C. Alan Williams, Corona Del Mar, all of Calif.

[73] Assignee: Control Data Corporation, Minneapolis, Minn.

[22] Filed: Sept. 16, 1974

[21] Appl. No.: 506,673

[52] U.S. Cl. .......... 179/15 AL
[51] Int. Cl.$^2$ .......... H04J 3/08
[58] Field of Search .......... 179/15 AL

[56] References Cited
UNITED STATES PATENTS
3,603,739 9/1971 Edson .......... 179/15 AL Primary Examiner—Ralph D. Blakeslee
Attorney, Agent, or Firm—Robert M. Angus

[57] ABSTRACT

A demand driven multiplexing system is provided having first and second closed-loop communications links, each connected to a central control station and to a plurality of serially-arranged remote stations. The central station includes means adapted to issue an end-of-batch code on one link and each remote station includes means responsive to the end-of-batch code to remo ve the same from any data train on the link and insert a message thereon, followed by the end-of-batch code. The central station also issues data trains on the other link, each data group having an address code. Each remote station is responsive to the address code to copy the particular data group from the link.

5 Claims, 2 Drawing Figures

DEMAND DRIVEN MULTIPLEXING SYSTEM

Figure 1:
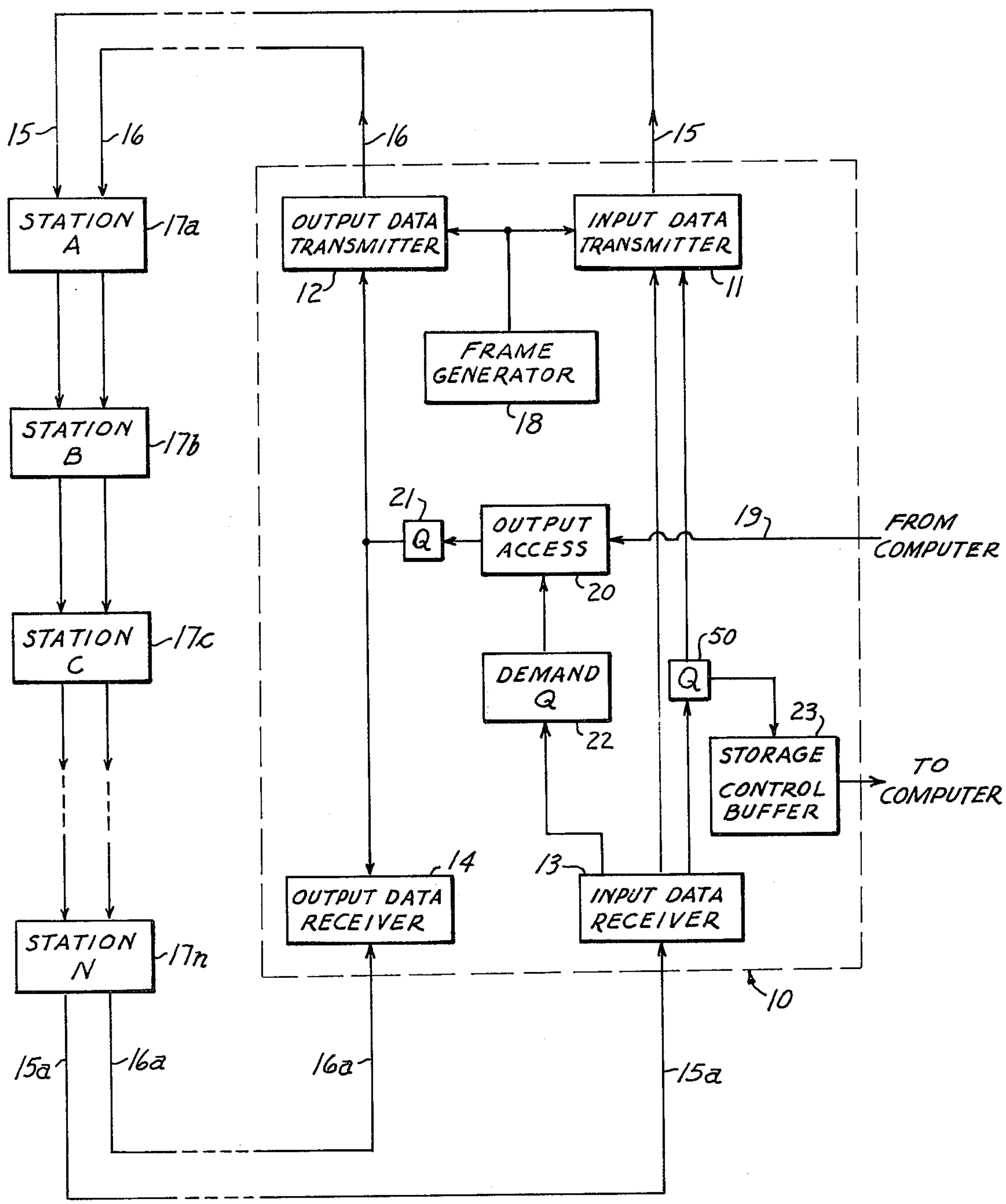

This invention relates to multiplexing techniques, and particularly to demand driven multiplexers.

Heretofore, multiplexers have been useful in the data processing art to transfer data between a central station and a plurality of remote stations. The data may include information codes or supervision codes, or both, and the term "data" is intended to include all forms of information, supervision and control messages. Some prior multiplexing systems utilized a "pyramid" arrangement in which individual remote stations are connected through tiers to the control or central station with addressing being accomplished by selectively gating the successive tiers. Another multiplexing technique common in data processing is the so-called "time division" multiplexing in which a predetermined period of time of each multiplex cycle is reserved for each remote station so that data addressed to or from that remote station is confined to that particular time slot.

Most multiplexing techniques are accomplished on an "interrogation-response" principle so that when a remote station is ready to send a message it sets a "flag" on the communication link and a central processor interrogates the stations to determine which stations have set flags. The central processor thereafter enables the stations to respond by transmitting their messages.

One common problem in multiplexing techniques resides in the fact that the speed of transmission and reception of data by the remote stations is significantly slower than the memory storage and access time of the central processor of the central station. To overcome this problem, some multiplexers slow the data rate to and from the processor to equal the rate on the lines, but this technique requires that the individual stations be connected to the memory for an excessive amount of time, thereby not fully utilizing the processing capabilities of the processor. Alternatively, complex buffering has been proposed to buffer data between the processor and each remote station so that the rate of data transmission between the remote station and the buffer may be accomplished at line speed (the rate established for the remote station), while data transmission between the buffer and the processor may be accomplished at a higher computer speed. While the latter approach offers the advantage of more fully utilizing the processor capabilities, the equipment associated with such buffering is costly.

The present invention relates to a demand driven multiplexer wherein data from a particular remote station is inserted onto a loop in a "train" fashion with the individual segments of the train containing data from particular remote stations and the length of the train being at least partially governed by the number of remote stations communicating with the central control and the length of their message texts. The control station processes the data and establishes the maximum length of the data train.

It is an object of the present invention to provide a multiplex loop for gathering input data and control signals from and distributing output data and control signals to communication lines on a demand basis.

It is another object of the present invention to provide a demand driven multiplex loop system having a plurality of remote stations serially connected in a loop to a central station to transmit data between the central control and the individual remote stations.

Another object of the present invention is to provide a demand driven multiplex loop system for gathering and distributing data between remote stations and a central station wherein data from each station are inserted on the loop in a data train, each remote station removing an end-of-batch code from the train and inserting its own data and end-of-batch code thereon.

In accordance with the present invention a multiplex loop is provided with a central station and an input loop and an output loop. A plurality of remote stations are connected to both the input and the output loops for inserting data onto the input loop and for copying data from the output loop. A loop controller of the central station supplies a plurality of loop cells of predetermined length; one of said cells containing an "end-of-batch" code. Each remote station, if ready to insert data onto the input loop, removes the end-of-batch code from a cell, inserts its data, and replaces the end-of-batch code into the next following cell. The process continues until a train of data is returned to the central station. Similarly, the output loop is continuously monitored by each remote station for an address unique to the individual remote station, which station copies and processes the data associated with the particular address.

One feature of the present invention resides in the fact that communications on the loops may be accomplished at a rate higher than the line rate of the individual stations.

Another feature of the present invention resides in the provision of buffering means for buffering data between the multiplex loops and a channel to a computer memory. To avoid overloading the buffer, the loop controller issues a train of cells comprising, in sequential order, a cell containing an end-of-batch code, a plurality of cells containing "empty" codes, and a plurality of cells containing "null" codes; the stations, if ready to transmit, remove the end-of-batch code from the one cell and insert their data followed by the end-of-batch code. However, if the cell following the end-of-batch coded cell contains a null code, station transmission is inhibited, thereby controlling the length of the total messages on the train to accommodate the buffer.

Another feature of the present invention is the provision of cell frame bits issued by the loop controller to maintain the system in synchronism.

Another feature of the present invention resides in the provision of decode and control apparatus operable in conjunction with a shift register at each remote station for inserting and copying data from the input and the output loops of the multiplex system.

Figure 2:
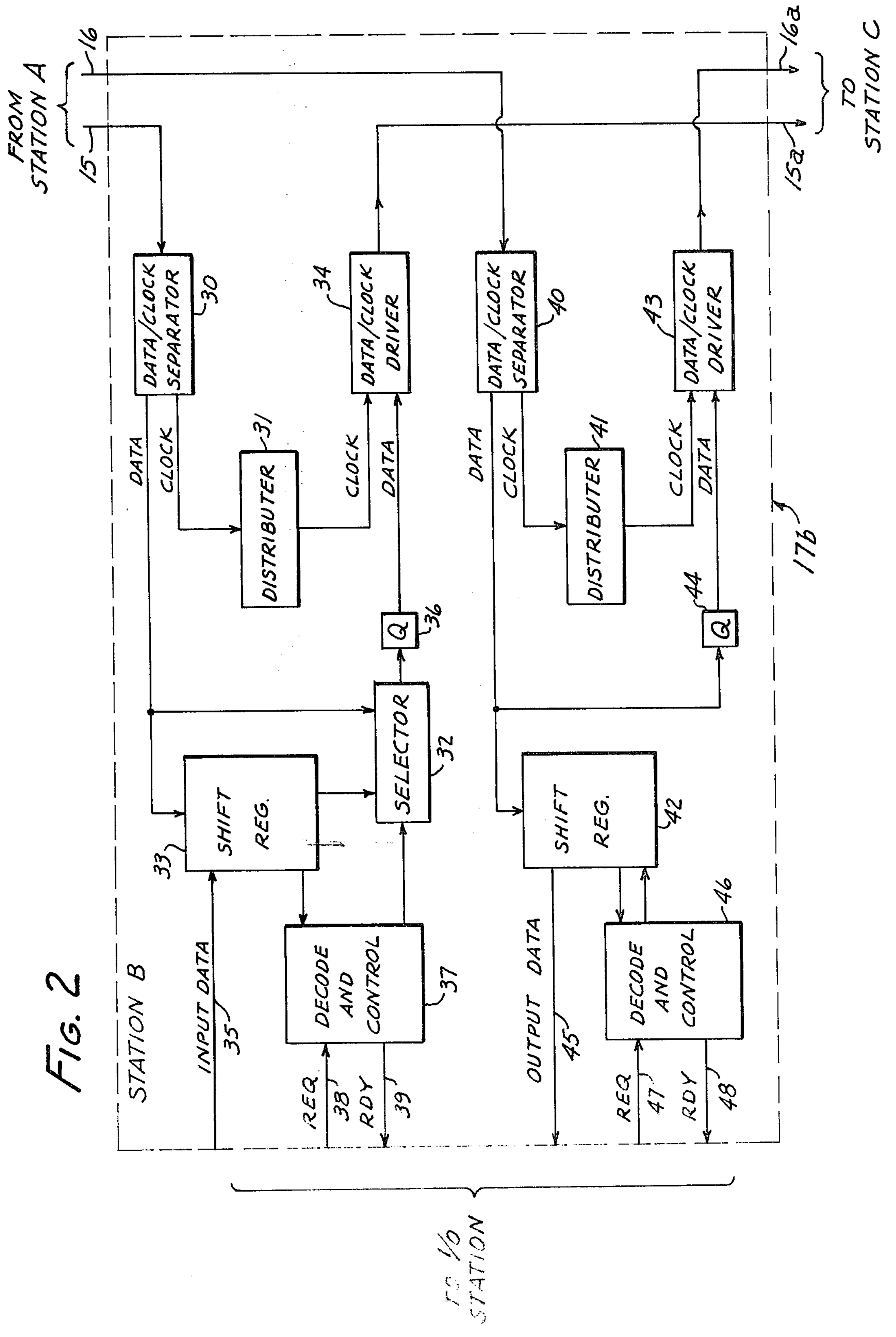

The above and other features of this invention will be more fully understood from the following detailed description and the accompanying drawing, in which:

FIG. 1 is a block circuit diagram of a demand driven multiplex system, showing certain details of the central station, in accordance with the presently preferred embodiment of the present invention; and FIG. 2 is a block circuit diagram of a remote station communications device for use with the apparatus shown in FIG. 1.

Referring to the drawings, and particularly to FIG. 1, there is illustrated a central station 10 having an input data transmitter 11 and an output data transmitter 12, an input data receiver 13 and an output data receiver 14. Transmitters 11 and 12 provide outputs to input channel 15 and output channel 16, respectively. Channels 15 and 16 are connected, sequentially, through a plurality of remote stations 17*a* through 17*n*, and continue via channels 15*a* and 16*a* to the inputs of receivers 13 and 14, respectively.

Transmitters 11 and 12 each receive an input from frame generator 18. Additionally, transmitter 11 receives an input from the output of receiver 13 and transmitter 12 receives an input from a computer (not shown) via channel 19, output access control circuit 20 and output frame queuing circuit 21. Also, the output from queuing circuit 21 is connected as an input to receiver 14. Receiver 13 also provides an output to output demand queuing circuit 22 which provides an input to output access control circuit 20. Storage control buffer 23 receives an input from receiver 13 through input frame queuing circuit 50. Buffer 23 provides an output to the storage access control portions of the central computer (not shown). Queuing circuit 50 also provides a control output to transmitter 11.

With reference particularly to FIG. 2, typical interface apparatus for a remote station is shown. Input loop 15 provides an input to data/clock separator circuit 30 which in turn provides a clock output to distributer 31 and a data output to selector 32 and shift register 33. Distributer 31 provides a clock output to data/clock driver circuit 34 which in turn provides an output via input channel 15*a* to the next successive station interface apparatus. Shift register 33 receives input data via channel 35 from the input/output (I/O) circuits of the remote station (not shown). Shift register 33 provides an output to selector 32 which in turn provides an output via channel queuing circuit 36 to data/clock driver circuit 34 for insertion of data onto channel 15*a*. Decode and control circuit 37 is provided for receiving control signals from the I/O circuits (not shown) via channel 38 and for transmitting control signals via channel 39 to the I/O circuits. Additionally, control circuit 37 receives control signals from shift register 33 and provides control signals to selector 32.

Data/clock separator 40 receives data and clock signals from output data channel 16 and provides a clock output to distributer circuit 41 and a data output to shift register 42 and data/clock driver circuit 43 through queuing circuit 44. Additionally, data/clock driver circuit 43 receives data from queuing circuit 44 and clock signals from distributer circuit 41 and provides output data and clock signals to the output data channel 16*a* for transmission for the next subsequent remote station. Shift register 42 provides output data to the I/O station via channel 45. Additionally, control circuit 46 is provided for receiving control signals from the I/O station via channel 47 and for transmitting control signals to the I/O station via channel 48. Control signals are also exchanged between control circuit 46 and shift register 42.

By way of example, the I/O station connected to channels 35, 38, 39, 45, 47 and 38 may be a suitable input/output station having means for inserting data onto channel 35 and for extracting data from channel 45. Such I/O station may comprise a suitable key entry device having a display or other suitable unit for reading data therefrom, such as a suitable alphanumeric display and/or printout device and the like.

OPERATION

As will be more fully explained hereinafter, data transmission on loops 15 and 16 is serial at a fixed rate, for example 50 Megabits per second. Data is framed in such a manner that every twelfth bit is a cell-frame marker that defines a twelve-bit cell. The cell-frame marker is followed by a control code, for example, three bits, whose contents define the purpose of the contents of the field of the cell. The field is the remaining bits of the cell, and in the example given, consists of eight bits. Consecutive cells are grouped into line frames as will be more fully understood hereinafter. The control portion of an issued cell from the central station may contain a code indicative of either loop management or loop usage. For loop management the field (the last eight bits of the cell) pertains to the management of the loop as a transmission facility, whereas in the loop usage mode, the contents of the field of the cell pertains to the usage of the loop for accomplishing movement of high level information transactions between the computer connected to the central station and the I/O stations connected to each remote station.

DATA TRANSMISSION

In the data transmission mode, wherein data is to be transmitted from a remote station 17 to central station 10 for eventual storage in the computer, frame generator 18 together with transmitter 11 issues a plurality of cells embraced by cell-frame markers as heretofore described. The field of the cells will contain either an end-of-batch code, an empty code, or a null code. At the beginning of each loop issued by the transmitter 11, the first cell will contain an end-of-batch code for purposes to be hereinafter explained. Following the end-of-batch code, the next successive cells will contain empty codes indicative that the cells contain no useful data. Following the cells containing an empty code, generator 18 and transmitter 11 may issue a plurality of cells each containing a null code, indicative that they also contain no useful data, but distinctive from the empty coded cells for purposes to be hereinafter explained.

With reference to FIG. 2, and assuming that a remote station is ready to transmit information to the central station, the contents of the data to be transmitted to the central station are stored in shift register 33, such information having been placed in shift register 33 via input data channels from the key input portion of the station (no shown). A "ready-to-transmit" control signal is forwarded from the I/O station to decode and control circuit 37 to control selector 32 to pass data from separator 30 to driver 34.

All data received by separator circuit 30 via channel 15 is processed through separator circuit 30. Assuming the apparatus illustrated in FIG. 2 is ready to transmit data, all incoming data cells are forwarded directly to selector 32 which has been preconditioned via decode and control circuit 37 to forward data cells through queuing circuit 36 to driver 34 for data transmission via channel 15*a* to the next succeeding station. Selector 32, however, delays retransmission of the data by one cell. At the same time, the data is also forwarded through shift register 33 to decode and control circuit 37. Assuming that the initial portion of the signal train contains data from prior stations, decode and control circuit 37 merely discards the data received from prior stations; such data being forwarded directly through separator 30, selector 32, and driver 34. However, upon receipt of the data cell containing the end-of-batch code, decode and control circuit 37 recognizes that code and operates selector 32 to halt forwarding of further data received via separator circuit 30. Instead, decode and control circuit 37 conditions selector 32 to forward the contents of shift register 33 directly through queuing circuit 36 and driver circuit 34 for insertion onto channel 15*a* for transmission to the next succeeding remote station. The end-of-batch code is temporarily stored in shift register 33 immediately following the data stored therein so that upon completion of transmission of the data, the end-of-batch code is forwarded from shift register 33 via selector 32 to driver 34.

If the station is not ready to transmit data to the channels 15, 15*a*, selector circuit 32 is operated so that all data and clock signals received from the prior station via channel 15 is forwarded through separator circuit 30. Separator circuit 30 forwards the clock signals to distributer circuit 31 to driver 34 for retransmission onto line 15*a* to maintain the system in synchronism, while data from the prior station is forwarded through selector 32 and queuing circuit 36 to driver 34 for retransmission onto channel 15*a*. Simultaneously, a control signal is forwarded from shift register 33 through control circuit 37 via channel 39 to the substation advising the substation that it may insert data via channel 35 to shift register 33. Thus, when the station is not ready to transmit, the station operates as a relay station utilizing only the circuits of separator 30, selector 32, queuing circuit 36 and driver 34.

Referring to FIG. 1, the storage capacity of buffer 23 may be controlled through the use of null codes transmitted by input data transmitter 11. Thus, if the buffer 23 is capable of storing X number of cells, and if it is known that the shift register 33 of any individual station is no larger than Y number of cells, input data transmitter 11 will transmit no more than $X - Y$ number of empty cells. Further, if each station transmits Y or less cells, at least $X \div Y$ number of stations may transmit during any one pass of the end-of-batch code. All cells transmitted subsequent to the empty cells will contain a null code. Upon receipt of the end-of-batch code following data from prior stations, shift register 33 and decode and control circuit 37 senses the end-of-batch code and examine the contents of the next following cell to determine such cell contains an empty or a null code. If the cell following the end-of-batch code contains an empty code, selector 32 is operated as heretofore explained for data transmission of the data contained in shift register 33 onto channel 15*a*. However, if the code following the end-of-batch code contains a null code, decode and control circuit 37 inhibits selector 32 from transmitting data from shift register 33 and the end-of-batch code is retransmitted through selector 32 through driver 34 for insertion on line 15*a*. Thus, through the use of empty and null codes, the length of the data train on channel 15, 15*a* is controlled, thereby avoiding overloading of buffer 23 in the control station. (Quite obviously, even if only one cell following the end-of-batch code contains an empty code, data transmission is permitted thereby filling cells previously containing empty and null codes, but this condition will not hinder operation of the system because the number of null codes to be occupied by data will not exceed Y number of cells so that the contents of buffer 23 will not overflow.)

Receiver 13 of control station detects the number of frames utilized by the input data to control the number of frames containing empty codes for the next data train to be transmitted by transmitter 11.

DATA RECEPTION

In the receive mode of the multiplexing system, data to be received by a particular remote station is requested by the output access circuit 20 via channel 19 based on the contents of demand queuing circuit 22. The computer forwards the requested data to the output access circuit 20 via channel 19. The address and data are forwarded through queuing circuit 21 to data transmitter 12 where it is assembled into cell frames of the type heretofore described. Specifically, each cell is a twelve-bit cell wherein every twelfth bit is a cell-frame marker bit, the next three bits define a control code to define the purpose of the field of the cell, and the last eight bits (the field) comprises the data (e.g. information, supervision or address codes). The cells are arranged in groups, or line frames, with the initial cell (or cells) containing the address code, the next successive cell or cells containing the data code (information or supervision) and the last cell containing a check code. Also, the cell frame marker bit forms the clock signal for synchronism purposes, as heretofore explained.

The cells and line frames are received by separator circuit 40 of each station apparatus 17 in succession via channel 16. If the station is ready to receive data, a control signal is received from the station output device by decode and control circuit 46 via channel 47. All cells are continuously forwarded from separator circuit 40, through queuing circuit 44 to driver circuit 43 for insertion onto channel 16*a* to the next successive station. All cells are also continuously forwarded to shift register 42 to be stored therein. Decode and control circuit 46 continuously monitors the contents of the cells contained in shift register 42. Assuming the initial cells do not contain the address of the particular station, such cells are shifted out of shift register 42 and discarded as new cells are received from separator circuit 42. However, when decode and control circuit 46 senses the address of the particular station, circuit 46 operates shift register 42 to accept the following data cells and store them. Upon receipt of the check cell following the data cells, decode and control circuit locks shift register 42 to accept no further data cells, and advises the station via channel 48 that the received data is in the shift register and ready for read out via channel 45 for processing or display by the I/O station.

If the station is not ready to receive data from the central computer, decode and control circuit inhibits shift register 42 so that data on channel 16, 16*a* is relayed through apparatus 17 via separator 40, queuing circuit 44 and driver 43.

Data may be called up by a remote station by inserting appropriate call-up data in shift register 33 and requesting the data using the transmission mode of the multiplexing system. The data is then received as described hereinabove and forwarded to demand queuing circuit 22 for use as explained above.

Output channel 16*a* terminates at receiver 14 which checks and discards the data.

SUMMARY

Central station 10 regulates the rate of arrival of input data from the remote stations by transmitting an appropriate proportion of empty and null coded cells onto the input loop based on the space available in storage control buffer 23. When none of the remote stations input data onto input loop 15, input frame queuing circuit 50 will be empty. Queuing circuit 50 therefore controls transmitter 11 to transmit a proportionally high number of empty coded cells. As remote stations commence transmitting data via channel 15*a*, queuing circuit 50 starts to fill with data, to thereby control transmitter 11 to reduce the number of empty coded cells, and increase the number of null coded cells, thereby reducing the input data arrival rate at the central station input queuing circuit. With the reduction of input data arrival rate, the central station will operate the input queuing circuit to move relatively higher level queues to buffer 23 for forwarding to the computer. Thus, more space becomes available in queuing circuit 50 to handle a higher rate of input data arrival, thereby causing queuing circuit 50 to operate transmitter 11 to increase the number of empty coded cells.

One feature of the present invention resides in the fact that the massage or data to be transmitted to or from a particular substation may send or receive a short or a long message encompassing a few, or many, cells eithout introducing delay such as may be occasioned by fixing a predetermined period of time of the transmission or reception of a message of predetermined length. Further, while the apparatus has been described as in connection with the use of a single address cell wherein the field of such address cell contains eight bits permitting addressing of up to 256 substations, provision may be made for an address extension code permitting a larger address to extend into subsequent cells.

The present invention thus provides a multiplex system which provides separate input and output loops for maximizing responsiveness and thruput for the transmission of data. By separating the input and output data loops, a station may send and receive data simultaneously on a statistical basis, thereby increasing thruput of data and decreasing delay. Further, since the stations transmit and receive data on demand, delay is minimized on the loop by increasing the delay only when the station has data ready to transmit. Therefore, such delays are statistical in nature rather than fixed. By properly queuing the data and synchronizing the system through use of the framing bits, there is never a demand for data larger than the storage available in the computer or in buffers associated with the central station.

This invention is not to be limited by the embodiment shown in the drawings and described in the description, which is given by way of example not of limitation, but only in the accordance with the scope of the appended claims.

What is claimed is:

1. A demand driven multiplexing system comprising, in combination: a first closed-loop communication link serially connecting a central station to a plurality of remote substations; said central station including first central transmitting means for transmitting a signal train onto said first link, said signal train comprising a plurality of signal cells, a first of said cells containing a first predetermined code, a first plurality of cells following said first cell each containing a second predetermined code, and a second plurality of cells following the last of said first plurality of cells each containing a third predetermined code; each of said remote substations including first remote receiving means and first remote transmitting means, each of said first remote transmitting means being connected to said first link for transmitting a signal train to a first remote receiving means of the next subsequent remote substation connected to said link, and each of said remote receiving means being connected to said first link for receiving a signal train from the next prior remote substation, each of said remote substations further including first control means connected to the respective first remote receiving means for monitoring the signal train received by the respective remote receiving means, said first control means including first data storage means for storing data to be transmitted by said first remote transmitting means, said first control means being responsive to said first predetermined code in a cell of said signal train to remove said predetermined code from such cell and to operate the respective first storage means and first remote transmitter means to substitute the contents of the cell previously containing said first predetermined code with data from said first storage means and to insert said first predetermined code into a cell of said signal train immediately following the last cell containing data from the respective first storage means; said central station further including first central receiving means for receiving a signal train from the last of said serially arranged remote substations, storage control means responsive to data in the signal train received by said first central receiving means for forwarding such data to a computer, and queuing means responsive to data in the signal train received by said first central receiving means for operating said first central transmitting means to selectively adjust the proportion of cells containing said second and third predetermined codes.

2. Apparatus according to claim 1 wherein said queuing means is connected to receive data from said first central receiving means, and said storage control means is connected to receive data from said queuing means.

3. A demand driven multiplexing system comprising, in combination: a first closed-loop communication link serially connecting a central station to a plurality of remote substations; said central station including first central transmitting means for transmitting a signal train onto said first link, said signal train comprising a plurality of signal cells, at least one of said cells containing a first predetermined code; each of said remote substations including a first remote receiving means and first remote transmitting means, each of said first remote transmitting means being connected to said first link for transmitting a signal train to a first remote receiving means of the next subsequent remote substation connected to said link, and each of said remote receiving means being connected to said first link for receiving a signal train from the next prior remote substation, each of said remote substations further including first control means connected to the respective first remote receiving means for monitoring the signal train received by the respective remote receiving means, said first control means including first data storage means for storing data to be transmitted by said first remote transmitting means, said first control means being responsive to said first predetermined code in a cell of said signal train to remove said predetermined code from such cell and to operate the respective first storage means and first remote transmitter means to substitute the contents of the cell previously containing said first predetermined code with data from said first storage means and to insert said first predetermined code into a cell of said signal train immediately following the last cell containing data from the respective first storage means; a second closed-loop communications link serially connecting said central station and plurality of remote substations, said central station further including second central transmitting means for transmitting a data train onto said second link, said data train comprising a plurality of data cells arranged in frames with the initial cells of each frame containing an address code unique to an individual one of said plurality of remote substations and the following cells in each frame containing data intended for reception by the respective remote substation, each of said remote substations including second remote receiving means and second remote transmitting means, each of said second remote receiving means being connected to said second link for receiving said data train and each of said second remote transmitting means being connected to the respective second remote receiving means and to said second link for transmitting said data train received by said second remote receiving means onto said second link, each remote substation further including second control means connected to the respective second remote receiving means and responsive to the address code of the respective remote substation for copying data from said data train intended for said remote substation.

4. Apparatus according to claim 3 wherein each of said remote substations further includes second storage means for storing data copied from said data train.

5. Apparatus according to claim 3 wherein said cells are marked by a framing bit, and synchronizing means responsive to said framing bits for synchronizing transmission of said signal train and said data train by said first and second control transmitting means.

* * * * *